United States Patent
Montoya Cifuentes

(10) Patent No.: US 10,919,804 B2
(45) Date of Patent: Feb. 16, 2021

(54) METHOD FOR PRODUCING CEMENTING MATERIALS PRODUCED FROM THE RECYCLING OF INDUSTRIAL WASTE FROM THE PROCESSES OF PRODUCING CERAMICS AND BRICKS

(71) Applicant: Natalia Andrea Montoya Cifuentes, Bogota (CO)

(72) Inventor: Natalia Andrea Montoya Cifuentes, Bogota (CO)

( * ) Notice: Subject to any disclaimer, the term of this patent is extended or adjusted under 35 U.S.C. 154(b) by 139 days.

(21) Appl. No.: 16/334,146

(22) PCT Filed: Jun. 26, 2017

(86) PCT No.: PCT/IB2017/000789
§ 371 (c)(1),
(2) Date: Dec. 18, 2019

(87) PCT Pub. No.: WO2018/055441
PCT Pub. Date: Mar. 29, 2018

(65) Prior Publication Data
US 2020/0354270 A1 Nov. 12, 2020

(30) Foreign Application Priority Data
Sep. 20, 2016 (CO) .............................. 2016/0002043

(51) Int. Cl.
*C04B 7/24* (2006.01)
*C04B 7/43* (2006.01)
*B09B 3/00* (2006.01)

(52) U.S. Cl.
CPC ............ *C04B 7/246* (2013.01); *B09B 3/0083* (2013.01); *C04B 7/43* (2013.01)

(58) Field of Classification Search
CPC .......... B09B 3/0083; C04B 7/246; C04B 7/43
See application file for complete search history.

(56) References Cited

FOREIGN PATENT DOCUMENTS

WO 2008070942 A2 6/2008
WO WO-2018177447 A1 * 10/2018 ........... C04B 14/062

OTHER PUBLICATIONS

"Liu" et al., "Investigation of using hybrid recycled powder from demolished concrete solids and clay bricks as a pozzolanic supplement for cement", Construction and Building Materials, 2014, vol. 73, pp. 754-763.
Patel et al., "The Potential Pozzolanic Activity of Different Ceramic Waste Powder as Cement Mortar Component (Strength Activity Index)", International Journal of Engineering Trends and Technology (IJETT), 2014, vol. 9, No. 6, pp. 266-271.
Pacheco et al., "Mechanical Properties and Durability of Concrete With Partial Replacement of Portland Cement by Ceramic Wastes", Wastes: Solutions, Treatments and Opportunities, 2011, pp. 1-6.
Sanchez De Rojas et al., "Aprovechamiento Del Cascote Cerámico Como Material Puzolánico", Cemento Hormigon , 2008, vol. 915, pp. 32-41.
"Standard Specification for Coal Fly Ash and Raw or Calcined Natural Pozzolan for Use in Concrete", ASTM International, 2005, C 618—05, pp. 1-3.
International Search Report for Corresponding international Application No. PCT/IB2017/000789, (dated Oct. 26, 2017) (3 Pages).

* cited by examiner

Primary Examiner — Anthony J Green
(74) Attorney, Agent, or Firm — Lucas & Mercanti, LLP

(57) ABSTRACT

A method for producing a cementing material from the waste from the brick and ceramics industry is provided, the method being selecting the batches of waste from bricks and ceramics for a subsequent grinding, in which they should achieve a grain size of between 20 and 40 microns, and wherein this waste can be mixed together or used individually to be subsequently included in the cement in a proportion of up to 30%, wherein the mixtures can achieve designs of up to 4000 PSI.

3 Claims, 2 Drawing Sheets

METHOD FOR PRODUCING CEMENTING MATERIALS PRODUCED FROM THE RECYCLING OF INDUSTRIAL WASTE FROM THE PROCESSES OF PRODUCING CERAMICS AND BRICKS

CROSS REFERENCE TO RELATED APPLICATION

This Application is a 371 of PCT/IB2017/000789 filed on Jun. 26, 2017 which, in turn, claimed the priority of Colombian Patent Application No. NC2016/0002043 filed on Sep. 20, 2016, both applications are incorporated herein by reference.

TECHNOLOGICAL FIELD

The present invention reveals a procedure for processing waste from the brick and ceramics industry, having the objective of the use thereof in the cement industry, entailing significant energy and economic saving in the related industries, for example those of construction and infrastructure.

BACKGROUND

The cement industry generates significant harmful environmental impacts, such as the generation of atmospheric emissions, contaminated effluents, high consumption of energy, and generation of waste. At the same time there are generated harmful impacts for human health, both for the employees of this industry and for the communities in the vicinity of these industrial sites. This industry employs rotary kilns for the production of cement; this can be carried out by a wet process or by a dry process. The rotary kilns raise the materials to temperatures exceeding 1400° C. The principal raw materials are limestone, silica sand, clay, aluminum and iron. Gypsum is introduced during the final phase of the process, having the objective of providing setting properties to the cement. The technology of cement kilns is employed worldwide. Usually, cement plants are located close to limestone quarries, having the objective of reducing the costs of transport of raw material.

The harmful environmental impacts of cement operations arise in the following areas of the process: handling and storage of the materials (particulate material), grinding (particulate material), emissions during the cooling of the kiln (particulate material, combustion gases such as carbon monoxide (CO) and dioxide ($CO_2$), oxides of sulfur and nitrogen, and, in general, greenhouse gases). The water resource contaminants are to be found principally in spillages of kiln feed material (high pH, suspended solids, dissolved solids, principally potassium and sulfate), and in the cooling water of the process (residual heat).

The dust, in particular the free silica, constitutes a significant risk for the health of the employees of the plant, exposure whereto causes silicosis. Some of the aforestated impacts may be prevented completely, or reduced more successfully, if the site of the plant is selected with care.

In Colombia there is produced annually on average approximately 8.1 million tonnes of cement and a carbon footprint is generated of approximately and 0.5 equivalent tonnes of $CO_2$ per tonne of cement produced.

Furthermore, the Colombian brick and ceramics industry does not solely generate a carbon footprint through the utilization of fuels in the firing processes thereof, these being, respectively, approximately 0.2 equivalent tonnes of $CO_2$ per tonne of bricks produced and 0.3 equivalent tonnes of $CO_2$ per tonne of ceramics produced, but it also generates a great quantity of inert solid waste (breakages or final product rejects) estimated at 117 000 000 kilograms/year (117 thousand tonnes/year). Approximately 67% of this waste is sent to landfill, 6% is stored by the manufacturer, and solely 26% is reused, as may be observed in the following table.

| Brick/Ceramics Waste | 2014 | 2015 | Average, thousand tonnes |
|---|---|---|---|
| Stored (thousand tonnes) | 10 | 6 | 8 |
| Recycled (thousand tonnes) | 28 | 33 | 31 |
| Landfill (thousand tonnes) | 123 | 35 | 79 |
| Total (thousand tonnes) | 161 | 73 | 117 |

Flowing from that aforestated it is rendered necessary to seek alternatives based upon the concept of sustainable development, having the objective of designing new cementitious, or similar, materials to contribute to reducing the harmful environmental impacts, through the recycling of industrial waste, and generating new products, contributing to improvement in the quality of concretes.

At the present time alternatives have been developed for recycling of waste from the brick and ceramics industry; these developments may be observed in the following patent documents.

The patent CN10236357 entitled "Waste chamotte brick regeneration and utilization method, and concrete doped with waste chamotte brick powder" describes a method for the recycling of waste from a clay brick, this waste being crushed, sieved and mixed with the cement in a proportion of from 0-30% w/w.

The document CN104529363 "Method for preparing building material by utilizing waste ceramics and modified plant fibers" reveals the use of waste from ceramics and other construction materials together with modified vegetable fibers for the manufacture of construction materials, basically bricks.

And the document CN103613300 "Recycling and treatment process and device for waste ceramic by crushing and grinding and pre-mixed concrete" wherein there is described a process comprising the following stages: primary crushing of the ceramics to a nominal particle size <sand dust of 4 mm, repetition of the crushing stages until obtainment of a particle size of 0.315 mm, these fine powders to be used to substitute the natural sand in the production of concrete.

Effectively, all the aforedescribed inventions make use of industrial waste from brick and ceramics production, but the objective thereof is directed towards the manufacture of concrete to achieve the replacement of the use of sand or gravel in some cases, however they are not directed towards it being a cementitious material capable of replacing or being mixed with cement for utilization in mixtures of concrete, mortars and precast products.

This new concept is relevant for various reasons, one thereof is by virtue of the fact that the cost of production of the new cementitious materials from brick or ceramics waste is lower than the cost of production of cement, consequently partial substitution of the cement in the manufacture of concrete reduces costs and, furthermore, achieves a reduction in the carbon footprint, given that the carbon footprint of the brick and ceramics industry is smaller than that of cement in terms of equivalent tonnes of $CO_2$ per tonne produced, and, finally, the waste from the brick and ceramics industry increases in value through the application of the concept of the life cycle of a product (from the cradle to the cradle).

At the present time efforts have focused upon recycling industrial waste from brick and ceramics manufacture for application as aggregates for concrete and for addition to cement, however efforts have not been made to obtain cementitious materials capable of replacing cement and accomplishing the mitigation of reactivity in concrete; it must be noted that these cementitious materials, proposed by the present invention, present characteristics similar to those of cement.

DETAILED DESCRIPTION OF THE INVENTION

Figure 1:
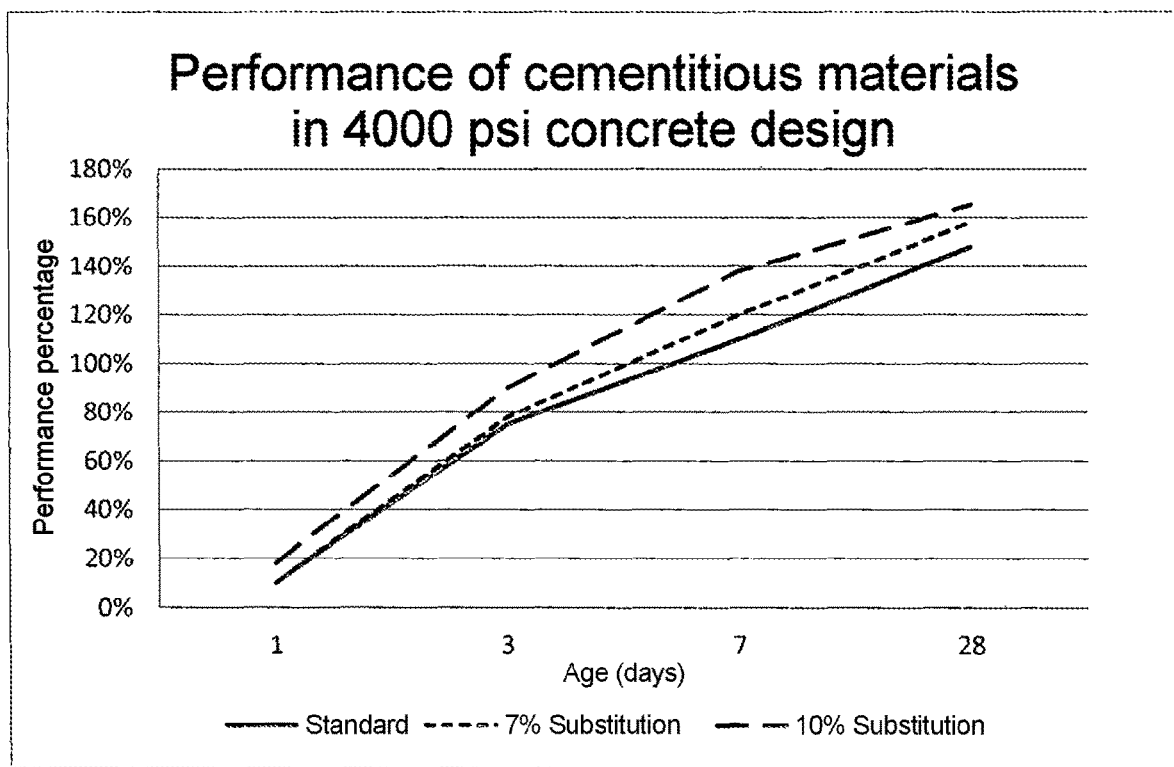
FIG. 1 shows the performance of two compositions containing 7% and 10% of the new cementitious material according to the invention compared against a standard of a particular type of cement (for concrete), the balance of the percentage being cement.

The cementitious materials proposed by the present invention have been designed and developed to resolve the aforestated problems, by virtue of the fact that by using industrial waste from brick and ceramics manufacture, and once having been converted into cementitious materials, they generate less environmental impact by virtue of the fact that less greenhouse gases are emitted and, furthermore, they have a smaller carbon footprint than the manufacture of cement.

The locations where industrial waste is generated must be identified, whether from bricks and/or ceramics. An initial process of selection must be carried out upon each waste material to verify that it does not contain contaminant particles or materials such as plastics, wood, carbon, ash, metals, others, and, subsequently, materials characterization is carried out to identify the chemical composition, the mineralogical composition, the quantity of amorphous materials, the loss on ignition, and the temperature whereat the initial crystalline structure thereof was modified.

On having identified the potential use of the waste as cementitious materials, it requires to be passed through industrial processes of crushing, grinding and microgrinding. Once the material achieves the particular grain size fineness, the technical viability of the material must be evaluated in terms of the raw materials required by concretes, mortars or precast products. If the properties of the cementitious material are correct, when compared with those of cement, the appropriate percentage must be determined of substitution for cement in matrices of concrete, mortar and precast products.

A) Selection of Material
  Waste from Brick Works
    Cementitious products must be selected, manufactured from defective fired bricks (structural and nonstructural, roof tiles, pavers). These are silico-aluminous materials fired at temperatures of between 500 and 1100° C., free from contaminants of white or black ash, carbon, refired material, wood, plastic, metal, humidity. The production sheets of these materials must be examined for this purpose.
  Ceramic Waste
    Fired ceramic waste (wash hand basins, toilet bowls, cladding, refractory materials, insulant materials, ceiling roses, crockery) shall have the required characteristics, such as being of material fired at temperatures of between 700 and 1300° C., free of contaminants of white ash, metallic materials, wood, plastic, sludge, fine dust from a process of particulate material containment, humidity. The production sheets of these materials must be examined for this purpose.

B) Crushing
  Waste from Brick Works
    The material selected will be passed through mills for the purpose of primary and secondary crushing, concluding with a process of microgrinding whereby a fineness of the material corresponding to less than 10% retained on 325 (45 microns), 400 (38 microns) and 635 mesh (20 microns), and having a humidity lower than 5%, shall be obtained, having the objective of being used as a partial substitute for cement.
  Ceramic Waste
    Fired ceramic waste shall have the required characteristics, such as being silico-aluminous material fired at temperatures in a range between 700 and 1300° C., free of contaminants of white ash, metallic materials, wood, plastic, sludge, fine dust from a process of particulate material containment, humidity, and others, and will be passed through processes for particle reduction by means of primary and secondary crushing, concluding with a process of microgrinding whereby a fineness of the material corresponding to less than 10% retained on 325 (45 microns), 400 (38 microns) and 635 mesh (20 microns), and having a humidity lower than 5%, shall be obtained, having the objective of being used as a partial substitute for cement.

C) Mixing Fines
  Mixing fines from cementitious product waste (defective fired bricks) and ceramic waste (defective fired ceramic parts) at a ratio of between (60:40), (40:60), (50:50), or individually for the generation of the corresponding cementitious material.

D) Creation of Cementitious Material
  The percentage substitution in concrete matrices lies in the range from 1% to 30 on the basis of designs from 2500 psi to 12 000 psi.

E) Inhibition of Reactive Aggregate Conditions
  The percentages of addition in concrete matrices are applicable for any type of design, percentages of addition being from 5% upwards, depending on the degree of reactivity of the aggregate contained in the concrete matrix.

Advantages

Properties of the cementitious materials: great fineness, chemical resistance, mechanical strength, inhibitor of reactive aggregate conditions (alkali-aggregate reaction), and high pozzolanic activity. These materials are deemed to be similar to cement by virtue of:
  I. The chemical composition thereof
  II. The grain size thereof
  III. The pozzolanic index thereof
  IV. The interaction thereof in the concrete matrix
  V. Enduring strength
  VI. The handleability thereof
  VII. Incorporation into the cementitious matrix
  VIII. Inhibition of the alkali-aggregate reaction.

Depending on the application, these materials may be used both as partial substitutes in cement and in additives for concrete, taking into account that when employed as additives they will act as an inhibitor of alkali-aggregate reactions in the concrete.

It must be considered that the reactivity of aggregates arises by virtue of:
Environmental conditions
Temperature
External sources of alkalis.
Results
Physical-Chemical Properties One of the principal advantages of the new cementitious compositions is the maintenance of similar characteristics to those of traditional cements; in the table below the pozzolanic index thereof stands out, which same, although being variable by virtue of the nature of the materials, always fluctuates at approximately 100%, humidity does not exceed 5%, although habitually it is 1%, grain size is equal to that of traditional cements, as is the setting time thereof.

| Attribute | Portland cement | Pozzolanic cement | New cementitious composition |
|---|---|---|---|
| Pozzolanic index: | 100% | 100% | 85%-140% |
| Humidity: | <1% | <1% | <5% |
| Grain size | RM325: 8% | RM325: 8% | <40% 325 mesh, <50% 400 mesh, <80% 600 mesh |
| Curing time (min) | 120 | 120 | 120 |

In terms of chemical composition, the high content of $SiO_2$ and $Al_2O_3$ is emphasized, important for the pozzolanic reaction, although the quantity of CaO is low, for this reason it is important that the cementitious material contain an appropriate quantity of cement in order to be able to react and act in the concrete matrix.

| Substance | Cementitious material | Cement |
|---|---|---|
| $SiO_2$ | 69.8 | 22.45 |
| $Al_2O_3$ | 23.9 | 6.55 |
| $Fe_2O_3$ | 0.4 | 2.14 |
| CaO | 1.9 | 54.44 |
| MgO | 0.6 | 0.84 |
| $SO_3$ | — | 2.41 |
| $K_2O$ | 1.3 | — |
| $Na_2O$ | 1.2 | — |
| Free C | — | 0.16 |
| Loss on ignition | — | 9.19 |
| $P_2O_5$ | 0.1 | — |
| $TiO_2$ | 0.4 | — |

For better comprehension of the foregoing, the pozzolanic reaction is set out schematically as follows:

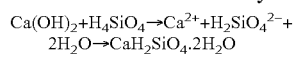

Performance

The performance of two compositions containing 7% and 10% of the new cementitious material was compared against a standard of a particular type of cement (for concrete), the balance of the percentage being cement (see FIG. 1). The test measures the percentage of performance to achieve a specific strength, in this case 4000 psi. In the graph below it may be observed that these new compositions attain the 4000 psi performance level more quickly, presenting an advantage of 4 days in attaining a minimum performance of 100% (4000 psi).

Standard Test for Potential Reactivity

This test method provides a means to determine the potential of an aggregate for use in concrete, measuring the potentially prejudicial internal expansion thereof. If the concrete expands by more than 0.1% in length at an early stage (first three days) the concrete is deemed to be deficient. Good quality aggregates (natural aggregates, river gravel and sand) prevent concrete being defective, nevertheless these aggregates are increasingly scarce and costly.

Figure 2:
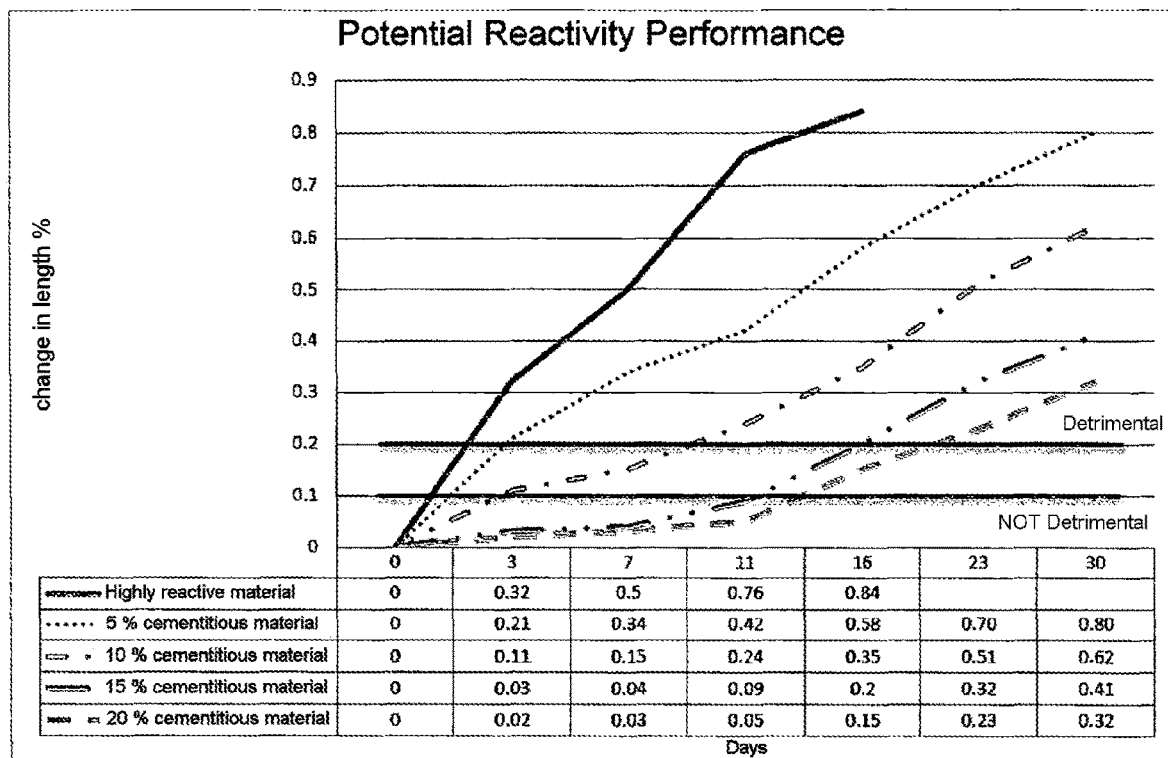
FIG. 2 shows how the use of the new cementitious material, according to the invention, in different proportions can considerably reduce potential reactivity, particularly those compositions having 15 and 20% substitutions, these demonstrating an expansion of 0.1 after 11 days.

One of the great advantages of this new cementitious material is in that it permits the use of aggregates of lesser quality, such as silicic minerals, and in preventing internal expansion and precluding potential reactivity. In the graph shown in FIG. 2, it may be observed how the use of this new cementitious material in different proportions can considerably reduce potential reactivity, particularly those compositions having 15 and 20% substitutions, these demonstrating an expansion of 0.1 after 11 days.

The foregoing graph is based upon the test according to ASTM C1567 and permits the determination of the efficiency of an additive (silica fume, ash or pozzolana) in minimizing or neutralizing the reaction.

The invention claimed is:
1. A method for producing cementitious materials made from the recycling of industrial waste from the processes of production of ceramics and brick, comprising:
   a. selecting structural and nonstructural brick waste or byproducts, which have been fired at a temperature of between 500 and 1000° C.
   b. selecting ceramic parts waste, which have been fired at a temperature of between 700 and 1200° C.
   c. separately crushing the waste selected in steps a and b until obtaining particle sizes of between 10 and 80 microns.
   d. mixing crushed fines resulting from step c to produce a cementitious material comprising from 40 to 60% of fines from brick waste and 40 to 60% of waste from ceramic parts.
2. The method for producing cementitious materials made from the recycling of industrial waste from the processes of production of ceramics and brick according to claim 1, wherein the material selected from steps a and b have a humidity of less than 1%.
3. The method for producing cementitious materials made from the recycling of industrial waste from the processes of production of ceramics and brick according to claim 1, wherein the cementitious material resulting from step d is incorporated into matrices of cement and/or concrete in a range from 0.5% to 40%.

* * * * *